(12) United States Patent
McInnes

(10) Patent No.: US 6,351,990 B1
(45) Date of Patent: Mar. 5, 2002

(54) LOW TIRE PRESSURE LIGHT INDICATOR

(76) Inventor: Robert P. McInnes, 17 Bambo Dr., Briney Breezes, FL (US) 33435

( * ) Notice: Subject to any disclaimer, the term of this patent is extended or adjusted under 35 U.S.C. 154(b) by 0 days.

(21) Appl. No.: 09/635,599

(22) Filed: Aug. 9, 2000

(51) Int. Cl.$^7$ ............................................ B60C 23/02
(52) U.S. Cl. ..................................................... 73/146.8
(58) Field of Search ............................ 73/146.2, 146.3, 73/146.4, 146.5, 146.8; 340/442, 443, 444, 445

(56) References Cited

U.S. PATENT DOCUMENTS

| | | | |
|---|---|---|---|
| 4,945,337 A | 7/1990 | Huang | 340/442 |
| 5,025,244 A | 6/1991 | Huang | 340/442 |
| 5,604,481 A | 2/1997 | Lin | 340/442 |
| 5,856,619 A | 1/1999 | Wang | 73/146.5 |

*Primary Examiner*—William Oen
(74) *Attorney, Agent, or Firm*—Alvin S. Blum

(57) ABSTRACT

A low tire pressure indicator is hermetically sealed to a tire valve stem absent the valve core. The indicator includes an elongate body having a seal to the wall of the valve stem at a first end and a valve core at a free second end. The air canal of the stem is in communication with an annular air passage defined by the elongate body. A resilient element disposed intermediate the two ends is moved away from the long axis of the body by the air pressure in the annular air passage. A spring bias urges the element toward the axis. An electric switch mechanism actuated by the air pressure action on the resilient element is closed when the tire pressure is below a preset value, and open when the pressure is above that value. A light emitter such as a light emitting diode and a battery form a circuit with the switch mechanism to emit light when the pressure is low. The emitter and battery may be removed and replaced without disturbing the hermetic seal. Air may be added to the tire without disturbing the hermetic seal.

17 Claims, 2 Drawing Sheets

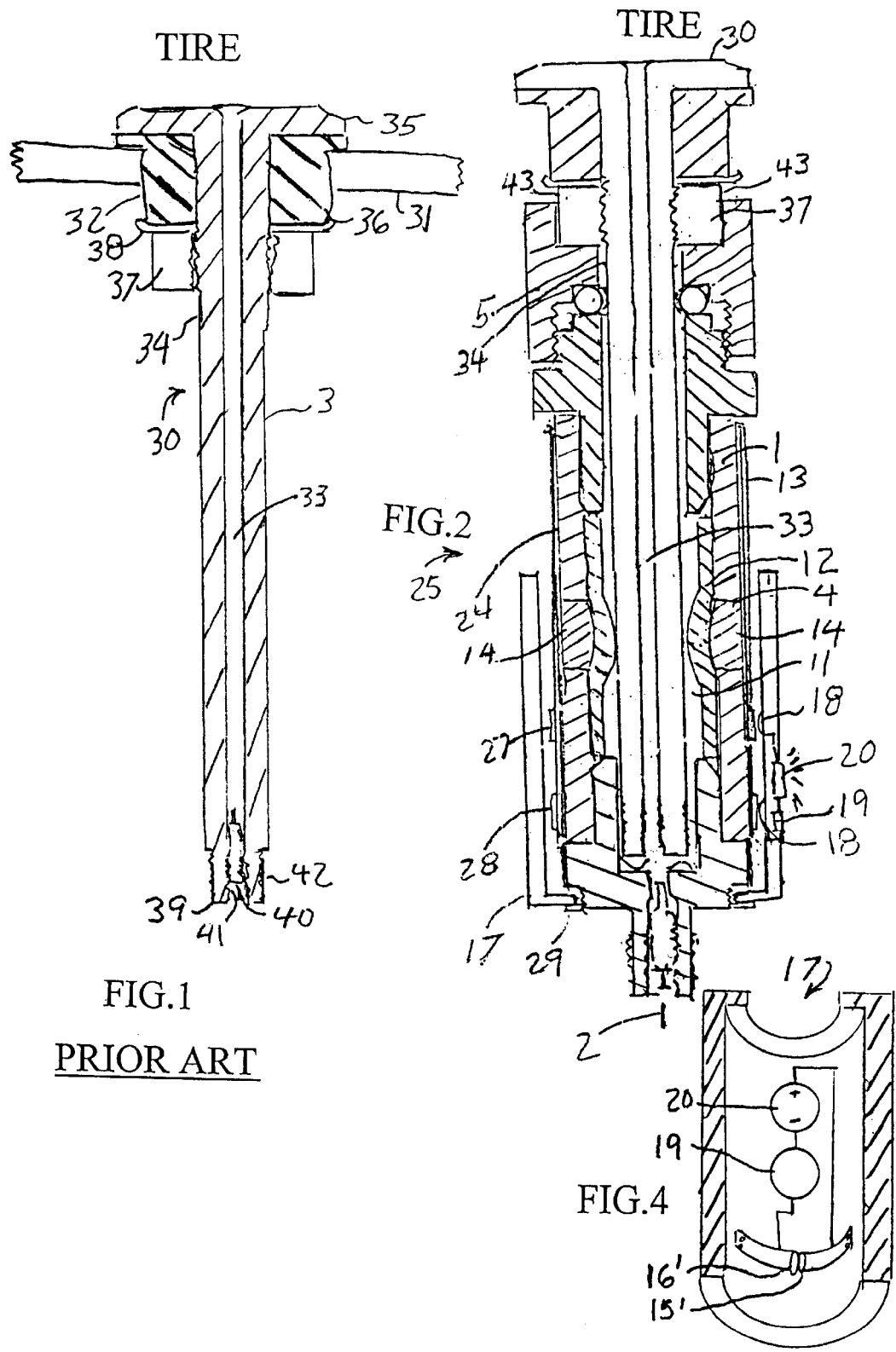

LOW TIRE PRESSURE LIGHT INDICATOR

BACKGROUND OF THE INVENTION

This invention relates to pneumatic vehicle tires, and more specifically to valves for such tires that indicate a low pressure condition by lighting a lamp.

DESCRIPTION OF THE PRIOR ART

Tubeless tires for motor vehicles are inflated by valve stems passing through a standard size hole in the wheel rims, to which they are hermetically sealed by a resilient shouldered bushing seal that is compressed by a nut. Any device that will not permit passage of the stem through the standard hole in the rim will not be acceptable. The tires are also sealed to the rims. A valve core screws inside the stem free end, and is sealed in the stem to permit air to pass only when an inner element in the core is depressed. A cover cap screws onto an outer thread on the stem. If a tire is run without adequate pressure, it will be subject to damage, and may endanger the vehicle.

Prior art to indicate by a light signal that tire pressure is low is exemplified by U.S. Pat. Nos. 4,945,337 and 5,025,244 issued to Huang; U.S. Pat. No. 5,604,481 issued to Lin; and U.S. Pat. No. 5,856,619 issued to Wang. They include a chamber with a battery, and a light that is turned on when the pressure falls below a preset value. In every case, the chamber replaces the cover cap by screwing onto the external thread of the valve stem. There is no problem with passage through the standard hole in the rim, because they are mounted on the stem after it is in place. In order for the chamber to sense the pressure inside the tire, a protuberance at the end of the chamber presses on the inner element of the valve core, opening it. A resilient gasket seals the chamber to the end of the stem to prevent loss of tire pressure. In order to add air to the tire, the chamber must be removed. If the chamber is not replaced properly without trapping debris at the seal, or becomes partially unscrewed, or the gasket leaks, pressure may be lost. No provision is made for adjusting the light so that it is easily seen. They all emit light at the tip of the chamber considerably past the tip of the stem, where it will have limited visibility in some cases. Another problem is that the device may be stolen by simply unscrewing it.

SUMMARY OF THE INVENTION

It is accordingly an object of the invention to provide a device that will visually indicate when tire pressure is low. It is another object that the device not be easily stolen. It is another object of the invention that the device not lead to inadvertent tire pressure loss. It is yet another object of the invention that the device provide adjustment to position the light source so that it is readily seen. It is yet another object that air may be added to the tire without disturbing the hermetic seal. The low tire pressure indicator of the invention uses a tire stem without valve core that is sealed to the wheel rim. The invention includes all of the pressure sensing elements sealed to the stem to greatly reduce the dangers of theft and of inadvertent pressure leakage. A valve core is positioned at the end of the assembly where it can be accessed for adding air without disturbing hermetic sealing. A chamber containing a battery and a light emitter is connected to the stem to respond to sensing of a low tire pressure by emitting light. The chamber may be adjusted to ensure that light emitted from the side of the chamber is easily seen. It may be removed for battery testing and replacement without disturbing the seals. These and other objects, features, and advantages of the invention will become more apparent when the detailed description is studied in conjunction with the drawings in which like elements are designated by like reference characters in the various drawing figures.

BRIEF DESCRIPTION OF THE DRAWINGS

FIG. 1 is a sectional detail view of a tire stem of prior art in place on a wheel rim.

FIG. 2 is a side elevation sectional view of the invention in place on a wheel rim.

FIG. 4 is a partially cut through perspective view of the chamber of another embodiment of the invention.

DETAILED DESCRIPTION OF PREFERRED EMBODIMENTS

Figure 3:
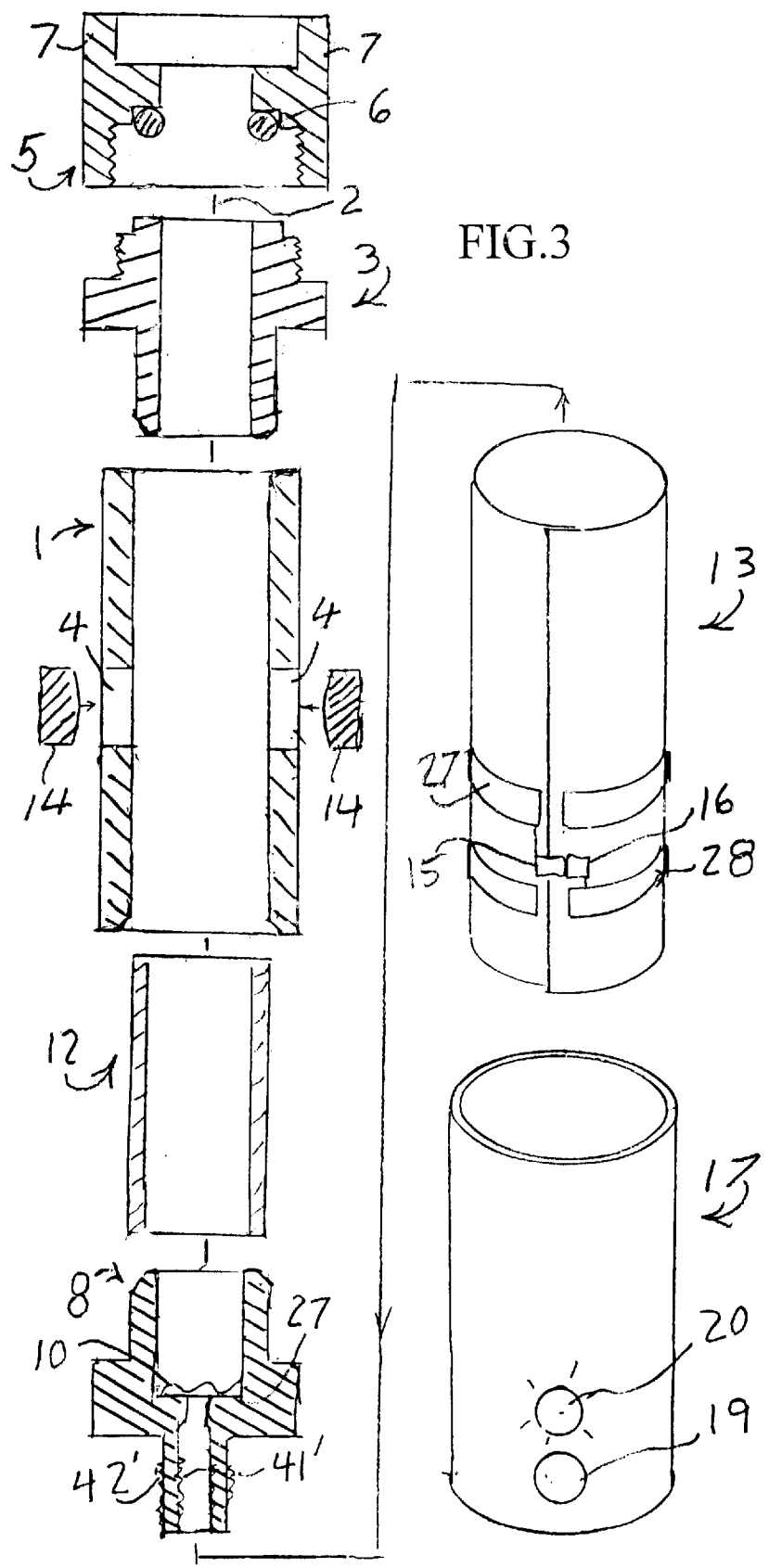
FIG. 3 is an exploded view of the device of FIG. 2.

Referring now to the drawing FIGS. 1–3, as best seen in the prior art drawing of FIG. 1, wheel rims 31 are all made with a standard hole 32 to receive a standard tire stem 30. On heavy trucks, a resilient seal 36 in the form of a shouldered bushing is compressed by seal-compressing-nut 37 and washer 38 against the flange 35 of the stem. At the free end 39 of the stem an internal thread 41 holds the valve core 40 sealed against the wall of the internal canal 33. An external thread 42 is provided for mounting a protective cap. On light trucks and automobiles, a less sturdy means of securing the stem with a molded snap on rubber flange (not shown) is employed. The invention may be employed with these stems as well.

The low tire pressure indicating device 25 of the invention includes a tire stem assembly or attachment 24 having a tubular body 1 with a long axis 2, a first plug 3 sealed into a first end, and a second plug 8 sealed into the second end away from the rim. Transverse apertures 4 pass through the side wall of body 1 intermediate the ends. Assembly 24 seals onto the outer wall 34 of the tire stem 30 by means of a jam nut 5 compressing resilient seal member 6 against the first end plug 3. The seal member 6 may be a sleeve or an O-ring. The jam nut 5 has ears 7 that extend over parallel facets 43 of the hex nut 37, thereby holding nut 5 from turning when attachment 24 is turned. This facilitates installation in the cramped space available. Second plug 8 has an internal thread 41' for sealing therein a valve core, and an external thread 42' for holding a valve cover, as in the conventional tire stem. An inner shoulder 27 in plug 8 supports a lock washer 10 that serves two purposes. It resists unscrewing by thieves. It provides an air passage between the internal canal 33 of the stem and the annular air passage 11 of the body 1. A resilient element in the form of a soft rubbery tube 12 fits tightly against the inner wall of body 1, forming a hermetic seal thereto that may include adhesive. Buttons 14 are slidingly received in apertures 4. Spring bias means in the form of a spiral tubular spring 13 urges the buttons inward toward the axis 2, thereby deforming rubbery tube 12 when tire pressure is low. When tire pressure is increased, rubbery tube 12 forces buttons 14 away from the axis against the spring 13, causing it to expand. Electric switch contacts 15 and 16 are affixed to the spring. They are in contact with one another until tire pressure higher than a preset level forces tube 12 against buttons 14 and the buttons in turn force the spring open enough to separate the contacts, thereby opening the switch. Circumferencial conductive bands 27 and 28 are connected to switch contacts 15 and 16 respectively.

Chamber 17 is removably attached to the assembly 24. The chamber includes a lamp such as light emitting diode 20 partially connected to battery 19. Spring contact fingers 18 must be connected to complete the circuit. The fingers 18 are disposed to contact the bands 27 and 28, which will complete the circuit and light the lamp when the pressure is low. The chamber may be rotated about the axis 2 to enable the lamp to be more visible in use. The chamber may be removed to check battery and light operation, and to replace a weak battery. The entire chamber may be replaced, if desired. It is held in place by nut 29.

Referring now to the alternative embodiment shown in FIG. 4, the switch contacts 15', 16' are mounted in the resilient chamber 17'. They are held in contact by the rubbery tension of the chamber. When the chamber is in place, the contacts will be forced apart by spring 13' only when the tire pressure is above a preset level. Alternatively, other switch mechanisms well known in the art may be employed that are mounted in the chamber and that respond to the expansion of the spring bias means, such as a spring loaded pushbutton (not shown).

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A low tire pressure indicating device comprising:
   a) an elongate tire stem assembly having a long axis; a first end adapted for hermetically sealing to a wheel rim; a second end; an air passage within the stem assembly extending from the first end to the second end; the second end provided with an internal thread to receive sealingly therein a valve core; a resilient element disposed intermediate the first and second ends communicating with the air passage for transmission of air pressure in the passage to the resilient element for moving the resilient element away from the long axis at elevated pressure; and the stem assembly being hermetically sealed by hermetic sealing means to prevent leakage of tire pressure;
   b) spring bias means for urging the resilient element toward the long axis;
   c) an electric switch mechanism actuated by movement of the resilient element away from the long axis so as to open when pressure in the passage is above a preset value, and to close when pressure in the passage is below the preset value;
   d) a chamber attached to the stem assembly, the chamber containing a battery and a light emitter operatively connected to the switch mechanism so as to emit light only when the switch is closed; and
   e) the device enabling air to be added to the tire through the valve core without disturbing the hermetic sealing means.

2. The device according to claim 1, in which the electric switch mechanism is attached fixedly to the tire stem assembly and the chamber is removable from the tire stem assembly without disturbing the hermetic sealing means.

3. The device according to claim 2 in which the chamber is rotatable to position the light emitter for optimal visibility.

4. The device according to claim 3, in which the light emitter is a light emitting diode.

5. The device according to claim 1, in which the electric switch mechanism is attached fixedly to the chamber, and the chamber is removable from the tire stem assembly without disturbing the hermetic sealing means.

6. The device according to claim 5 in which the chamber is rotatable to position the light emitter for optimal visibility.

7. The device according to claim 6, in which the light emitter is a light emitting diode.

8. A low tire pressure indicating device comprising:
   a) an elongate tire stem assembly having a tubular body with a side wall and a long axis; a first end adapted for hermetically sealing to a wheel rim; a second end; an air passage within the stem assembly extending from the first end to the second end; the second end provided with an internal thread to receive sealingly therein a valve core; at least one aperture through the side wall transverse to the long axis and intermediate the ends; a resilient tubular element inside the tubular body sealingly engaging the side wall, and covering the at least one aperture, the resilient tubular element being forced away from the long axis by air pressure in the passage; and the stem assembly being hermetically sealed by hermetic sealing means to prevent leakage of tire pressure;
   b) spring bias means for urging the resilient element toward the long axis;
   c) at least one movable member interposed between the spring bias means and the resilient tubular element for communicating motion therebetween through the at least one aperture;
   d) an electric switch mechanism actuated by movement of the resilient element away from the long axis so as to open when pressure in the passage is above a preset value, and to close when pressure in the passage is below the preset value;
   e) a chamber attached to the stem assembly, the chamber containing a battery and a light emitter operatively connected to the switch mechanism so as to emit light only when the switch is closed, the chamber emitting light out of a side wall, and being adjustable so as to position the emitter where it may be most easily seen; and
   f) the device constructed to enable air to be added to the tire through the valve core without disturbing the hermetic sealing means.

9. The device according to claim 8, in which the light emitter is a light emitting diode.

10. The device according to claim 9, in which the chamber is removable without disturbing the hermetic sealing means.

11. The device according to claim 10, in which the electric switch mechanism is affixed to the chamber.

12. The device according to claim 10, in which the electric switch mechanism is affixed to the stem assembly.

13. A low tire pressure indicating apparatus for retrofitting to a tire stem which has been mounted on a wheel rim holding a tubeless tire, the stem having an internal canal, an outer wall, a rim end with resilient seal and seal-compressing-nut, and a free end absent a valve core, the apparatus comprising:
   a) an elongate tire stem attachment having a long axis; a first end adapted for hermetically sealing to the outer wall of the tire stem with sealing means; a second end; an air passage within the stem attachment extending from the first end to the second end and communicating with the internal canal; the second end provided with an internal thread to receive sealingly therein a valve core;

a resilient element disposed intermediate the first and second ends communicating with the air passage for transmission of air pressure in the passage to the resilient element for moving the resilient element away from the long axis; and the stem attachment being hermetically sealed from the atmosphere by hermetic sealing means to prevent leakage of tire pressure;

b) spring bias means for urging the resilient element toward the long axis;

c) an electric switch mechanism actuated by movement of the resilient element away from the long axis so as to open when pressure in the passage is above a preset value, and to close when pressure in the passage is below the preset value; and d) a chamber removably attached to the stem attachment, the chamber containing a battery and a light emitter operatively connected to the switch mechanism so as to emit light only when the switch is closed, the chamber emitting light from a side wall, and being adjustable so as to position the emitter where it may be most easily seen; the device constructed to enable air to be added to the tire through the valve core without disturbing the hermetic sealing means.

14. The apparatus according to claim 13, in which the first end sealing means includes a jam nut, and a resilient seal member interposed between the jam nut and the first end for sealing against the outer wall of the stem, the jam nut constructed to engage the seal-compressing-nut to hold the jam nut from turning.

15. The apparatus according to claim 14, in which the light emitter is a light emitting diode.

16. The apparatus according to claim 15, in which the switch mechanism is affixed to the stem attachment.

17. The apparatus according to claim 15, in which the switch mechanism is affixed to the chamber.

* * * * *